United States Patent

Marnot

[11] Patent Number: 5,271,295
[45] Date of Patent: Dec. 21, 1993

[54] MECHANISM FOR TRANSMITTING POWER BETWEEN A DRIVING SHAFT AND TWO ASSEMBLIES TO BE DRIVEN

[75] Inventor: Paul H. Marnot, Cornillon-Confoux, France

[73] Assignee: Aerospatiale Société Nationale Industrielle, Paris, France

[21] Appl. No.: 64,369

[22] Filed: May 19, 1993

Related U.S. Application Data

[63] Continuation of Ser. No. 806,040, Dec. 12, 1991, abandoned.

[30] Foreign Application Priority Data

Dec. 12, 1990 [FR] France .................. 90 15571

[51] Int. Cl.⁵ ........................................ B64C 27/14
[52] U.S. Cl. ............................... 74/665 B; 74/665 E; 244/58; 244/60; 244/7 R
[58] Field of Search ............... 74/665 B, 665 E; 244/58, 60, 7 R

[56] References Cited

U.S. PATENT DOCUMENTS

| | | | |
|---|---|---|---|
| 3,362,255 | 1/1968 | Rocca et al. | 244/60 X |
| 4,479,619 | 10/1984 | Saunders et al. | 74/665 B X |
| 4,506,522 | 3/1985 | Swaney et al. | 244/60 X |
| 4,915,200 | 4/1990 | Jacques et al. | 244/60 X |
| 5,108,043 | 4/1992 | Canavespe | 244/60 X |

FOREIGN PATENT DOCUMENTS 1230679 9/1960 France .
1422328 11/1965 France .

Primary Examiner—Leslie A. Braun
Assistant Examiner—Daniel Wittels

[57] ABSTRACT

To ensure the power transmission between a driving shaft (42) and two assemblies to be driven, such as the rotor or rotors and the ancillary systems of a gyroplane, a mechanism is proposed, which has a connection shaft (48) constantly engaged on the driving shaft and on device (54) for riving the ancillary systems. An actuator (80) controls a translation of the connection shaft between a first position in which a free wheel (44), interposed between the driving shaft (42) and a device (46) for driving the rotor or rotors, occupies a rotation engagement state and a second position, in which the free wheel occupies a rotation disengagement state. This particularly simple mechanism can be switched from one state to the other, even during the rotation of the driving shaft.

7 Claims, 3 Drawing Sheets

MECHANISM FOR TRANSMITTING POWER BETWEEN A DRIVING SHAFT AND TWO ASSEMBLIES TO BE DRIVEN

This is a file wrapper continuation application pursuant to 37 CFR 1.62 of parent application, Ser. No. 07/806,040 filed on Dec. 12, 1991, now abandoned, and claims priority thereof under 35 USC 120.

BACKGROUND OF THE INVENTION (1) Field of the Invention

The invention relates to a power transmission mechanism for placing between a driving shaft and two assemblies to be driven in such way that, as required, the first of said assemblies may or may not be driven, whereas the second assembly is permanently driven either by the driving shaft or by the first assembly.

On a gyroplane such as a helicopter, such a mechanism can be used for the transmission of the power supplied by at least one engine of the said helicopter to the rotors and to ancillary systems. While the ancillary systems such as the pump, alternator and similar type are permanently driven via a driving shaft, the rotors, driven via the same shaft, can be disengaged from the shaft while allowing for continued operation of the ancillary systems.

As a result of the use of such a power transmission mechanism, it is possible to use the single engine or one of the engines used for driving the gyroplane rotor or rotors to also drive the ancillary systems. This leads to a simplification and a weight gain of significant magnitude compared with the conventional arrangement, in which the ancillary systems are driven via a special auxiliary engine not used for driving the rotors. When the gyroplane is flying, the engine simultaneously drives the rotor or rotors, as well as the ancillary systems. In the case of a desired or undesired stoppage in flight of the engine or engines, the rotor or rotors operate under autorotation conditions and can continue to drive the ancillary systems. When the gyroplane is on the ground and in the absence of any external energy source, the transmission mechanism makes it possible for the engine to drive the ancillary systems providing the electric power and hydraulic power necessary for certain checking, repair and test operations, whilst the rotors are not rotating.

(2) Description of the Related Art

FR-A-1 422 328 describes a power transmission mechanism designed for fulfilling the above functions. This mechanism comprises three coaxial shafts, respectively connected to a driving shaft and to each of the two assemblies to be driven, and three free wheels connecting the shafts in pairs. Moreover, an actuator manipulatable from the gyroplane cockpit makes it possible to pass the free wheel placed between the driving shaft and the connection shaft of the rotor or rotors from a state where it joins these two shafts in rotation to a state where said two shafts are not joined. In the latter state, the rotor or rotors are not driven by the engine, whereas the ancillary systems are driven by the engine.

Although it fulfills the desired functions, the mechanism described in FR-A-1 422 328 is heavy and particularly complex. It also incorporates complicated locking devices for preventing damage to the mechanism if the engagement state changes are not performed when the rotation speeds of the different shafts are not perfectly synchronized.

SUMMARY OF THE INVENTION

The present invention specifically relates to an original power transmission mechanism designed for fulfilling the same functions as that described in FR-A-1 422 328, but whose structure is particularly lightweight and simple and which makes it possible to change engagement states at all times.

The invention therefore relates to a mechanism for the transmission of power between a driving shaft and first and second assemblies to be driven, said mechanism incorporating a free wheel interposed between the driving shaft and a first assembly driving means for a first of the said assemblies, the free wheel comprising a driving member and a driven member, actuating means making it possible to pass the free wheel from a rotation engagement state to a rotation disengagement state between its driving member and its driven member and mechanical connection means between the driving shaft and a second assembly driving means, wherein the mechanical connection means incorporate a connection shaft constantly engaged on the driving shaft and on the first driving means of the second assembly, said connection shaft carrying a control member for the free wheel and being able to slide along its axis in response to said actuating means between a first position in which the control member places the free wheel in its rotation engagement state between its driving member and its driven member, and a second position in which the control member places the free wheel in its rotation disengagement state between its driving member and its driven member.

In a mechanism formed in this way, the passage of the free wheel placed between the driving shaft and the first assembly driving means from a driving to a non-driving position is directly controlled by effecting a translation of the connection shaft ensuring transmission between the driving shaft and the second assembly which is to be permanently driven, without it being necessary to use other complex mechanisms.

Moreover, it is important to note that the transmission of movements between the driving shaft and the assembly which is to be permanently driven takes place constantly through the connection shaft, which is always engaged both on the driving shaft and on the driving means of said latter assembly, no matter what the engagement state occupied by the free wheel. Consequently the free wheel state change control can take place at any time without any risk of damaging the mechanism, i.e. both when the free wheel is stopped and when it is operating.

The free wheel incorporates rollers mounted in a cage interposed between a driving member driven by the driving shaft and a driven member carrying the first assembly driving means, the control member being linked in rotation with said cage, so that with a sliding of the connection shaft along its axis between the first and second positions corresponds a rotation of said cage between two positions respectively corresponding to said rotation engagement state and said rotation disengagement state of the free wheel.

The connection shaft and the free wheel are then positioned coaxially, the control member incorporating at least one finger or pin fixed to the connection shaft and cooperating with an inclined ramp formed on an axial extension of the cage. The invention is more particularly applied to the case where the first assembly to be driven incorporates at least one gyroplane rotor and in which the second assembly to be driven incorporates at least one accessory of said gyroplane.

BRIEF DESCRIPTION OF THE DRAWINGS

The invention is described in greater detail hereinafter relative to non-limitative embodiments and the attached drawings, which show:

In FIG. 1, reference numerals 10 and 12 designate gas turbine engines whose main function is to rotate the main rotor and tail rotor of a helicopter. In order to fulfill this function, the output shafts of said engines are connected to the shafts 18, 20 of the main rotor 21 and the tail rotor 22 respectively through a power transmission mechanism shown diagrammatically in FIG. 1 and which in certain cases can assume different configurations without passing outside the scope of the invention.

Figure 1:
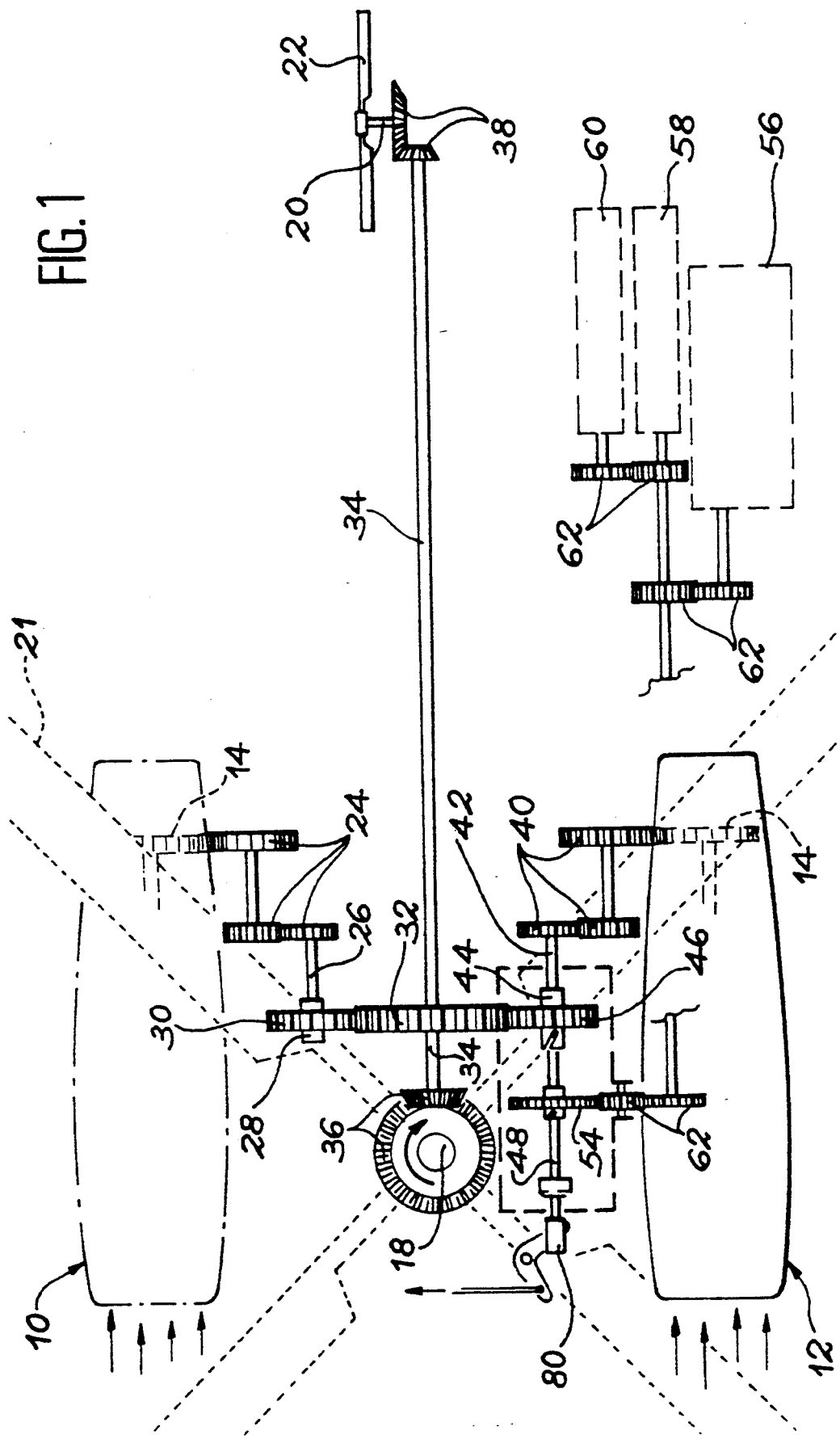
FIG. 1 a plan view diagrammatically illustrating the driving of the rotors and the ancillary systems of a helicopter equipped with two gas turbine engines, said transmission taking place, from one of said engines, through a mechanism according to the invention.

Starting from the output shaft 14 of the gas turbine engine 10, said mechanism comprises one or more gear trains 24 transmitting to a parallel shaft 26 the rotational movement of said output shaft. A free wheel 28, mounted on the shaft 26, drives a driven pinion 30 engaged on a toothed wheel 32 fixed to a shaft 34 parallel to the shaft 26 and to the output shafts of the engines.

At one of its ends, the shaft 34 rotates the shaft 18 of the main rotor 21 via bevel gears 36. In the same way, bevel gears 38 placed on the other end of the shaft 34 enable the latter to rotate the shaft 20 of the tail rotor 22.

The output shaft 14 of the motor 12 is mechanically connected to the toothed wheel 32 via one or more gear trains 40 placed between said output shaft and a driving shaft 42 parallel to the shafts 16 and 34, and a free wheel 44 mounted on said driving shaft 42 and driving a driven pinion 46 engaged on the toothed wheel 32.

As a result of the conventional arrangement driven hereinbefore, the gas turbine engines 10 and 12 normally rotate, when they are operating, the main rotor 21 and the tail rotor 22. The free wheels 28, 44 enable these rotors to rotate during the stoppage of one or more gas turbine engines or whenever the members connected to the rotors rotate faster than the members connected to the engines.

Figure 2:
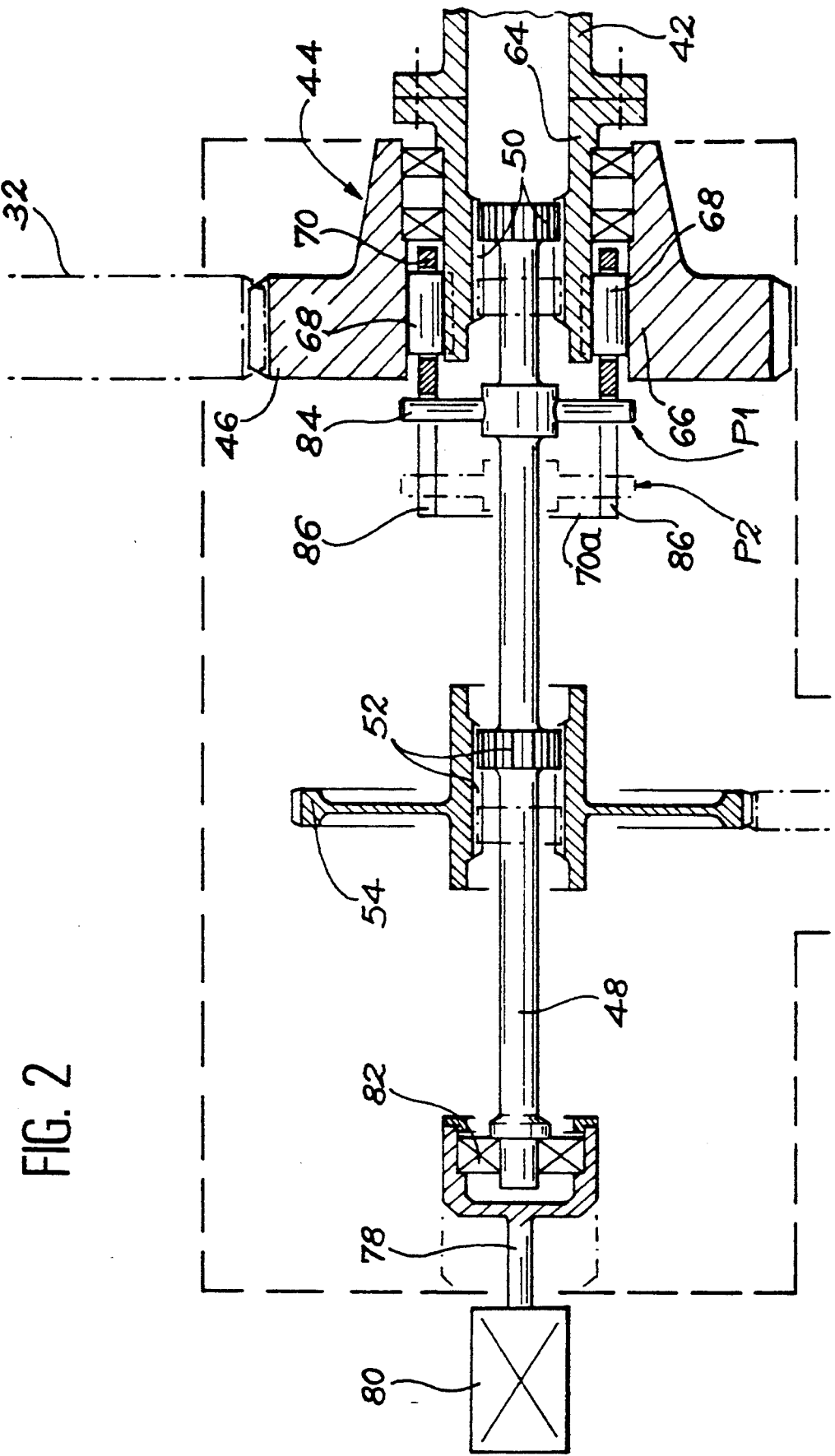
FIG. 2 A diagrammatic sectional view showing on a larger scale part of the power transmission mechanism used in the assembly illustrated in FIG. 1.

Moreover, a connection shaft 48 arranged coaxially to the driving shaft 42 is constantly engaged on the latter, via a system of splines 50 illustrated in FIG. 2. This connection shaft 48 is also constantly engaged, via a system of splines 52, with one or more gears 54 arranged coaxially around the shaft 48 and used for driving various ancillary systems such as an oil pump 56, an alternator 58 and a hydraulic pump 60 (FIG. 1). Obviously, this list of accessories is only given in an exemplified manner and the number of accessories driven by the connection shaft 48 can, as a function of the particular case, be greater or smaller than that represented in FIG. 1. Different gear trains 62 transmit the rotary movement of the gear 55 to the said accessories.

As is shown in greater detail in FIG. 2, the free wheel 44 for transmitting to the toothed wheel 32 the rotary movement of the driving shaft 42 comprises an internal driving tubular member 64 fixed to the end of the driving shaft 42, an external driven tubular member 66 carrying the pinion 46 and a system of rollers 68 interposed between the members 64 and 66 and whose relative positioning is ensured by a tubular cage 70.

Figure 4:
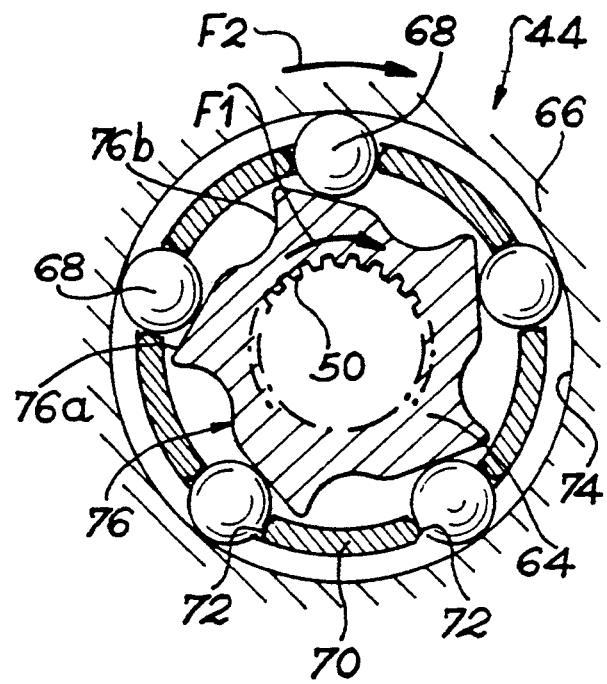
FIG. 4 A cross-sectional view of the free wheel in said normal operating state.
Figure 6:
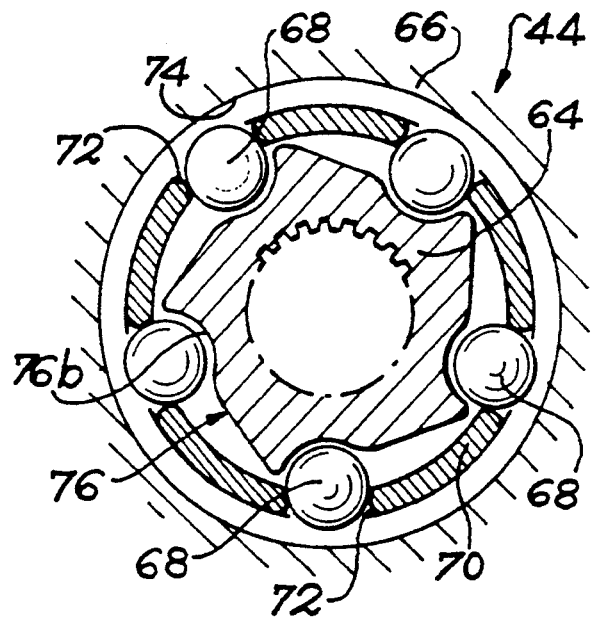
FIG. 6 A cross-sectional view comparable to FIG. 4 illustrating the free wheel in its disengaged position.

As is more specifically illustrated in FIGS. 4 and 6, the cylindrical rollers 68 are placed in windows 72 angularly distributed over the entire circumference of the tubular cage 70. Each of the rollers 68 is simultaneously in contact with the inner cylindrical surface 74 of the external driven tubular member 66 of the free wheel and with the outer surface 76 of the internal driving tubular member 64 of the free wheel. In front of each of the rollers 68, said outer surface 76 has a ramp 76a extended by a hollowed-out portion 76b.

As is more specifically illustrated by FIG. 4, the ramps 76a formed on the outer surface 76 of the inner driving part 64 of the free wheel are dimensioned in such a way that when the rollers 68 are placed on these ramps 76a, a rotation of the inner driving tubular member of the free wheel in the clockwise direction in FIG. 4 (arrow F1) leads to a jamming of the rollers 68 between these ramps 76a and the inner cylindrical surface 76 of the outer driven tubular member 66 of the free wheel. Consequently this rotation of the inner driving tubular member 64 in the direction of the arrow F1 leads to a rotation in the same direction and at the same speed (arrow F2) of the outer driven tubular member 66 of the free wheel.

However, when these rollers 68 are positioned in front of the hollowed-out portions 76b formed on the outer surface 76 of the inner driving tubular member 64 of the free wheel, between the rollers 68 and the surfaces 74 and 76 there is a sufficient clearance to enable a random rotation of one or other of the members 64 and 68 is not transmitted to the other member.

On once again referring to FIG. 2, it can be seen that the connection shaft 48 is extended beyond the pinion 54 for driving the ancillary systems, so as to be integral in translation with a control rod 78 located in the axial extension of the shaft 48 and which can be given a translatory movement by an actuator 80 controlled from the gyroplane cockpit. The connection between the end of the connection shaft 48 and the adjacent end of the control rod 78 is ensured by a rotary ball bearing 82 or by any other equivalent means allowing a rotation of the shaft 48 with respect to the rod 78, whilst ensuring that these two parts are integral in translation.

When the actuator 80 is not used, the assembly constituted by the control rod 78 and the connection shaft 48 occupies a first position P1 illustrated in continuous line form in FIG. 2, in which said assembly is moved to the maximum to the right and which determines, as will be shown hereinafter, a rotation engagement state between the driving and driven members of the free wheel 44.

This first position is automatically obtained, e.g. using an elastic means such as a not shown compression spring positioned within the actuator 80.

When the actuator 80 is used, the assembly constituted by the control rod 78 and the connection shaft 48 is moved to the maximum to the left in FIG. 2, into a second position P2 partly illustrated in broken lines therein. This second position corresponds to a rotation disengagement state between the driving and driven members of the free wheel 44.

The axial dimensioning of the splines 50 and 52 is adequate to ensure that the connection shaft 48 remains permanently engaged on both the inner driving tubular member 64 of the free wheel 44 and on the driving gear 54 for the ancillary systems, regardless of the position occupied by the connection shaft 48.

Figure 3:
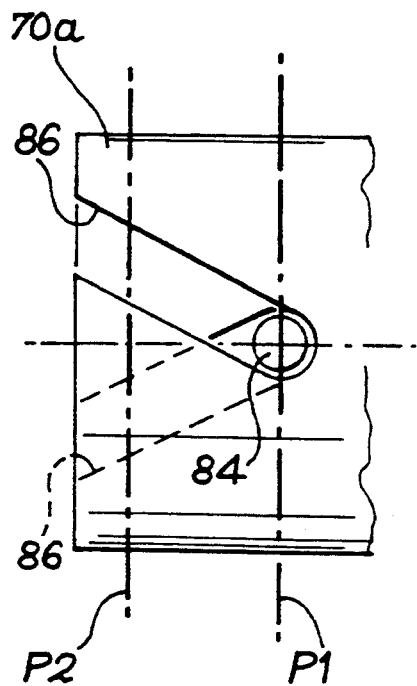
FIG. 3 A side view illustrating on a larger scale the relative position between a pin joined to the connection shaft and an inclined ramp formed in the cage of the free wheel when the latter occupies its normal operating state.
Figure 5:
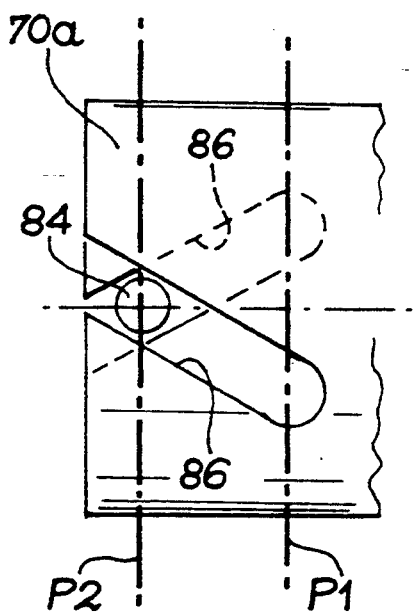
FIG. 5 A side view comparable to FIG. 3 illustrating the relative position of the pin fixed to the connection shaft and the inclined ramp formed in the cage of the free wheel when the latter occupies its disengaged position.

As is more specifically illustrated by FIGS. 2, 3 and 5, the translatory movements of the connection shaft 48 between these positions P1 and P2 are transmitted to the cage 70 of the free wheel 44 by a pin or stud 84 radially fixed to the shaft 48 and whose ends pass through two slots 86 formed at diametrically opposite locations on an axial extension 70a of the cage 70 outside the free wheel 44.

More specifically, the slots 86 formed in the extension 70a of the free wheel cage are inclined with respect to the axis of the latter, so as to form ramps, which bring about a predetermined relative rotation between the connection shaft 48 and the cage 70 when the connection shaft moves axially between the positions P1 and P2.

Thus, when the connection shaft 48 occupies its first position P1, the ends of the stud 84 are located in the bottom of the slots 86, as illustrated in FIG. 3. In the thus defined relative angular position between the cage 70 and the inner driving tubular member 64 linked in rotation with the connection shaft 40, the rollers 68 face ramps 76a formed on the outer surface 76 of the inner driving tubular member 64 of the free wheel, as illustrated in FIG. 4. This position defines a rotation disengagement state between the driving and driven members 64, 66 respectively of the free wheel.

In this rotation engagement state, a rotation of the driving shaft 42 driven by the gas turbine engine 12 is integrally transmitted to the rotors through the free wheel 44, as described relative to FIG. 4. This rotation engagement state of the driving and driven members of the free wheel 44 also makes it possible, if the engine 12 is stopped, to continue the rotation of the rotors, the jamming of the rollers 68 between the inner cylindrical surface 74 and the ramps 76a stopping as soon as the outer driven tubular member 66 rotates faster than the inner driving tubular member 64.

As illustrated in FIG. 5, the putting into operation of the actuator 80 has the effect of bringing the ends of the pin 84 into the portions of the slots 86 furthest from the free wheel 44. This displacement of the finger 84 in the slots 86 brings about a relative rotation between the cage 70 and the inner driving tubular member 64 of the free wheel 44 so that, as is illustrated in FIG. 6, the rollers 68 are positioned in front of the hollowed-out portions 76b of the outer surface 76 of the inner driving tubular member 64.

Under these conditions, the members 64 and 66 of the free wheel 44 are free to rotate with respect to one another, as stated hereinbefore relative to FIG. 6. Therefore the putting into operation of the actuator 80 makes it possible to transmit to the ancillary systems the power supplied by the gas turbine engine 12, without the helicopter rotors rotating. The supply of electric, hydraulic or any other power can consequently be ensured on the ground in the absence of any other external power source.

It should be noted that the power transmission mechanism according to the invention, of which a preferred embodiment has been described, makes it possible to fulfill all the standard functions of such a mechanism in a particularly simple and reliable way. Moreover, this mechanism makes it possible to pass from one operating state to the other without it being necessary to stop the gas turbine engines, because the connection shaft for driving the ancillary systems is constantly engaged both on the driving shaft and on the control gear or gears of said systems, as well as with the free wheel cage.

Obviously, the invention is not limited to the embodiment described in exemplified manner hereinbefore and in fact covers all variants thereof. Thus, in the case where the free wheel has a structure differing from that described, the passage of said free wheel from its engagement state into disengagement state can be controlled by the connection shaft in a manner different from that described. It is also clear that the mechanism according to the invention can be used on a gyroplane equipped with one or more engines and in more general terms in all cases when it is wished to drive two different assemblies from a single engine, when one of the said assemblies must be permanently drivable, whereas the other must be either drivable or non-drivable.

I claim:
1. A mechanism for power between a driving shaft and first and second assemblies to be driven, said mechanism comprising
   a free wheel interposed between the driving shaft and a first assembly driving means for transmitting rotary movement of the driving shaft to the first assembly driving means, the free wheel comprising
      a free wheel driving member fixed to an end of the driving shaft and comprising an extension thereof, and
      a free wheel driven member driving the first assembly driving means,
   actuating means for shifting the free wheel from a rotation engagement state to a rotation disengagement state between the free wheel driving member and the free wheel driven member,
   mechanical connection means between the driving shaft and a second assembly driving means, wherein the mechanical connection means comprises a connection shaft constantly drivingly connected with both the driving shaft and the second assembly driving means, said connection shaft carrying a control member for controlling the engagement state of the free wheel, and said connection shaft being able to slide along its axis in response to said actuating means between a first axial position in which the control member places the free wheel in the rotation engagement state, and a second axial position in which the control member places the free wheel in its rotation disengagement state.

2. The mechanism according to claim 1, wherein the free wheel further comprises rollers mounted in a cage interposed between the free wheel driving member and the free wheel driven member, the control member being linked in rotation with said cage such that the first and second axial positions of the connection shaft correspond, respectively, to a rotation of said cage between first and second discrete rotational positions respectively corresponding to said rotation engagement state and said rotation disengagement state of the free wheel.

3. The mechanism according to claim 2, wherein the connection shaft and the free wheel are arranged coaxially, the control member comprising at least one pin fixed to the connection shaft and extending therefrom in a radial direction, the pin being in sliding cooperation with a slot formed on an axial extension of the cage, the slot being oriented at an angle from the axis of the driving shaft, wherein the movement of the pin within the slot from one end thereof to another translates to the first and second rotational positions of the cage.

4. The mechanism according to claim 1, wherein the connection shaft is constantly drivingly connected on the driving shaft via a first system of splines and is constantly engaged on the second assembly driving means via a second system of splines.

5. The mechanism according to claim 1, wherein the actuating means comprises an actuator having a control rod which is connected to an extension of the connection shaft and which control rod is linked in translation with said extension by a rotary bearing.

6. The mechanism according to claim 1, wherein the first assembly to be driven comprises at least one gyroplane rotor and the second assembly to be driven comprises at least one ancillary system of said gyroplane.

7. A mechanism for the transmission of power between a driving shaft and first and second assemblies to be driven, said mechanism comprising a free wheel interposed between the driving shaft and a first driving means for transmitting rotary movement of the driving shaft to the first assembly driving means, the free wheel comprising
    a free wheel driving member fixed to an end of the driving shaft and comprising an extension thereof,
    a free wheel driven member driving the first assembly driving means, and
    rollers mounted in a cage interposed between the free wheel driving member and the free wheel driven member, actuating means for shifting the free wheel from a rotation engagement state to a rotation disengagement state between the free wheel driving member and the free wheel driven member, mechanical connection means between the driving shaft and a second assembly driving means, wherein the mechanical connection means comprises a connection shaft constantly drivingly connected with both the driving shaft and the second assembly driving means, said connection shaft carrying a control member for controlling the engagement state of the free wheel, said connection shaft and the free wheel being coaxial, and said connection shaft being able to slide along its axis in response to said actuating means between a first axial position in which the control member places the free wheel in the rotation engagement state, and a second axial position in which the control member places the free wheel in its rotation disengagement state, the control member being linked in rotation with said cage such that the first and second axial positions of the connection shaft correspond, respectively, to a rotation of said cage between first and second discrete rotational positions respectively corresponding to said rotation engagement state and said rotation disengagement state of the free wheel, wherein the control member comprises at least one pin fixed to the connection shaft and extending therefrom in a radial direction, the pin being in sliding cooperation with a slot formed on an axial extension of the cage, the slot being oriented at an angle from the axis of the driving shaft, whereby the movement of the pin within the slot from one end thereof to another translates to the first and second rotational positions of the cage.

* * * * *